(12) United States Patent
Iwasaki et al.

(10) Patent No.: US 10,394,330 B2
(45) Date of Patent: Aug. 27, 2019

(54) DEVICES AND METHODS FOR FACILITATING WIRELESS COMMUNICATIONS BASED ON IMPLICIT USER CUES

(71) Applicant: QUALCOMM Incorporated, San Diego, CA (US)

(72) Inventors: Jill Sayuri Iwasaki, San Diego, CA (US); Bennett Michael King, San Diego, CA (US); Kexi Liu, San Diego, CA (US); Martin Hans Renschler, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 336 days.

(21) Appl. No.: 14/203,063

(22) Filed: Mar. 10, 2014

(65) Prior Publication Data
US 2015/0256674 A1     Sep. 10, 2015

(51) Int. Cl.
*G06F 3/01* (2006.01)
*G06F 1/16* (2006.01)
*H04M 1/725* (2006.01)

(52) U.S. Cl.
CPC ............ *G06F 3/017* (2013.01); *G06F 1/1694* (2013.01); *G06F 3/013* (2013.01);
(Continued)

(58) Field of Classification Search
CPC ........ G06F 3/013; G06F 3/017; G06F 1/1694; G06F 3/011–015; G06F 3/16–167;
(Continued)

(56) References Cited

U.S. PATENT DOCUMENTS 6,396,509 B1 * 5/2002 Cheng .................... G06F 3/011
                                                                    715/706
7,614,001 B2    11/2009 Abbott et al.
(Continued)

FOREIGN PATENT DOCUMENTS

CN       101159086 A     4/2008
CN       102739869 A    10/2012
(Continued)

OTHER PUBLICATIONS

International Search Report and Written Opinion—PCT/US2015/019283—ISA/EPO—Jun. 8, 2015.

*Primary Examiner* — Jennifer N To
*Assistant Examiner* — Liang Y Li
(74) *Attorney, Agent, or Firm* — Loza & Loza, LLP (57) ABSTRACT

Access terminals are adapted to facilitate automated wireless communication interactions based on implicit user cues. According to one example, an access terminal can obtain a plurality of user cues, including user cues from at least two primary sensor inputs, as well as other optional user cues. The access terminal may identify the occurrence of a predefined combination of user cues from among the plurality of user cues. In response to the identification of the predefined combination of user cues, the access terminal may affect a wireless communication link with an access terminal associated with another user. Other aspects, embodiments, and features are also included.

19 Claims, 5 Drawing Sheets

(52) U.S. Cl.
CPC . *H04M 1/72583* (2013.01); *G06F 2200/1637* (2013.01); *H04M 1/72522* (2013.01)

(58) Field of Classification Search
CPC ............ G06F 2203/01; G06F 3/048; G06F 2203/011; H04M 3/432; H04M 1/72519–72597; H04M 1/26–54; G06T 19/006
See application file for complete search history.

(56) References Cited

U.S. PATENT DOCUMENTS

| | | | |
|---|---|---|---|
| 7,963,652 B2 | 6/2011 | Vertegaal et al. | |
| 8,014,763 B2* | 9/2011 | Hymes | H04M 1/26 455/414.2 |
| 8,894,484 B2* | 11/2014 | Latta | A63F 13/211 463/29 |
| 9,417,691 B2* | 8/2016 | Belimpasakis | G06F 3/011 |
| 2007/0190494 A1* | 8/2007 | Rosenberg | A63F 13/12 434/11 |
| 2011/0295392 A1 | 12/2011 | Cunnington et al. | |
| 2012/0075168 A1 | 3/2012 | Osterhout et al. | |
| 2012/0113135 A1* | 5/2012 | Sakai | G06F 3/011 345/619 |
| 2013/0050258 A1 | 2/2013 | Liu et al. | |
| 2013/0083062 A1 | 4/2013 | Geisner et al. | |
| 2013/0212501 A1 | 8/2013 | Anderson et al. | |
| 2013/0222271 A1 | 8/2013 | Alberth et al. | |
| 2013/0346168 A1 | 12/2013 | Zhou et al. | |
| 2014/0101608 A1* | 4/2014 | Ryskamp | G06F 3/0482 715/810 |
| 2014/0362728 A1* | 12/2014 | Krochmal | H04B 7/26 370/254 |
| 2015/0061824 A1* | 3/2015 | Suzuki | G06F 3/011 340/5.52 |
| 2015/0109191 A1* | 4/2015 | Johnson | G10L 15/22 345/156 |
| 2015/0156028 A1* | 6/2015 | Ballard | G02B 27/017 709/204 |
| 2016/0109947 A1* | 4/2016 | George-Svahn | G06F 3/165 345/156 |

FOREIGN PATENT DOCUMENTS

| | | |
|---|---|---|
| CN | 102932526 A | 2/2013 |
| JP | H08140158 A | 5/1996 |
| JP | 2004233909 A | 8/2004 |
| JP | 2005340974 A | 12/2005 |
| JP | 2013190925 A | 9/2013 |
| WO | 2012037290 A2 | 3/2012 |
| WO | 2013021385 A2 | 2/2013 |
| WO | 2013029020 A1 | 2/2013 |

* cited by examiner

FIG. 5

DEVICES AND METHODS FOR FACILITATING WIRELESS COMMUNICATIONS BASED ON IMPLICIT USER CUES

TECHNICAL FIELD

The technology discussed below relates generally to wireless communications, and more specifically to methods and devices for facilitating automated wireless communication interactions based on implicit user cues.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

Multiple types of wireless communications devices are adapted to utilize such wireless communications systems. These wireless communications devices may be generally referred to as access terminals. Typically, a user of an access terminal explicitly instructs an access terminal to perform a particular wireless communication operation, such as by an explicit voice command or physical touch command. As access terminals become more involved in the every-day life of a user, the ability of such access terminals to perform one or more wireless communication operations automatically may be desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate establishment, use, and termination of wireless communications with other users based on implicit user cues. According to at least one aspect of the disclosure, access terminals may include a wireless communications interface and a plurality of sensors, all coupled with a processing circuit. The processing circuit may be adapted to detect user cues via the plurality of sensors, where the user cues correspond to a combination of user cues including at least two of an eye gaze, an audio cue, and a gesture. The processing circuit may further be adapted to determine that the user cues indicate a desire to communicate with another user. In response to the detected user cues, the processing circuit can be adapted to affect a wireless communication link via the wireless communications interface with an access terminal associated with the other user.

Further aspects provide methods operational on access terminals and/or access terminals including means to perform such methods. One or more examples of such methods may include obtaining a plurality of user cues, such as user cues from at least two primary sensor inputs. A determination may be made that predefined combination of user cues have occurred from among the plurality of obtained user cues. Additionally, a wireless communication link with an access terminal associated with another user may be affected in response to the determination of the occurrence of the predefined combination of user cues.

Still further aspects include processor-readable storage mediums comprising programming executable by a processing circuit. According to one or more examples, such programming may be adapted for causing the processing circuit to obtain a plurality of user cues. The plurality of user cues may include user cues from at least two primary sensor inputs selected from a group of primary sensor inputs that includes an eye gaze, an audio cue, and a gesture. The programming may further be adapted for causing the processing circuit to determine an occurrence of a predefined combination of user cues from among the plurality of obtained user cues. Additionally, the programming may further be adapted for causing the processing circuit to affect a wireless communication link with an access terminal of another user in response to the determination of the occurrence of the predefined combination of user cues.

Other aspects, features, and embodiments associated with the present disclosure will become apparent to those of ordinary skill in the art upon reviewing the following description in conjunction with the accompanying figures.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

Conventional access terminals typically affect a wireless communication link via a wireless network when a user explicitly instructs an access terminal to perform a particular wireless communication operation. For instance, a communication link is typically established when the user explicitly instructs the access terminal to establish the communication link, such as by a voice command instructing the access terminal to call a particular number or contact, or a physical touch command selecting a contact and instructing the access terminal to call the selected contact. Similarly, a communication link is typically ended when the user explicitly instructs the access terminal to end the communication link, such as by a physical touch of a button or touchscreen to end a call. In another example, the transmission of data or information over a wireless communication link typically occurs when a user explicitly instructs the access terminal to transmit the data or information, such as by selecting the data, selecting the intended recipient, and selecting a send button on the access terminal.

Figure 1:
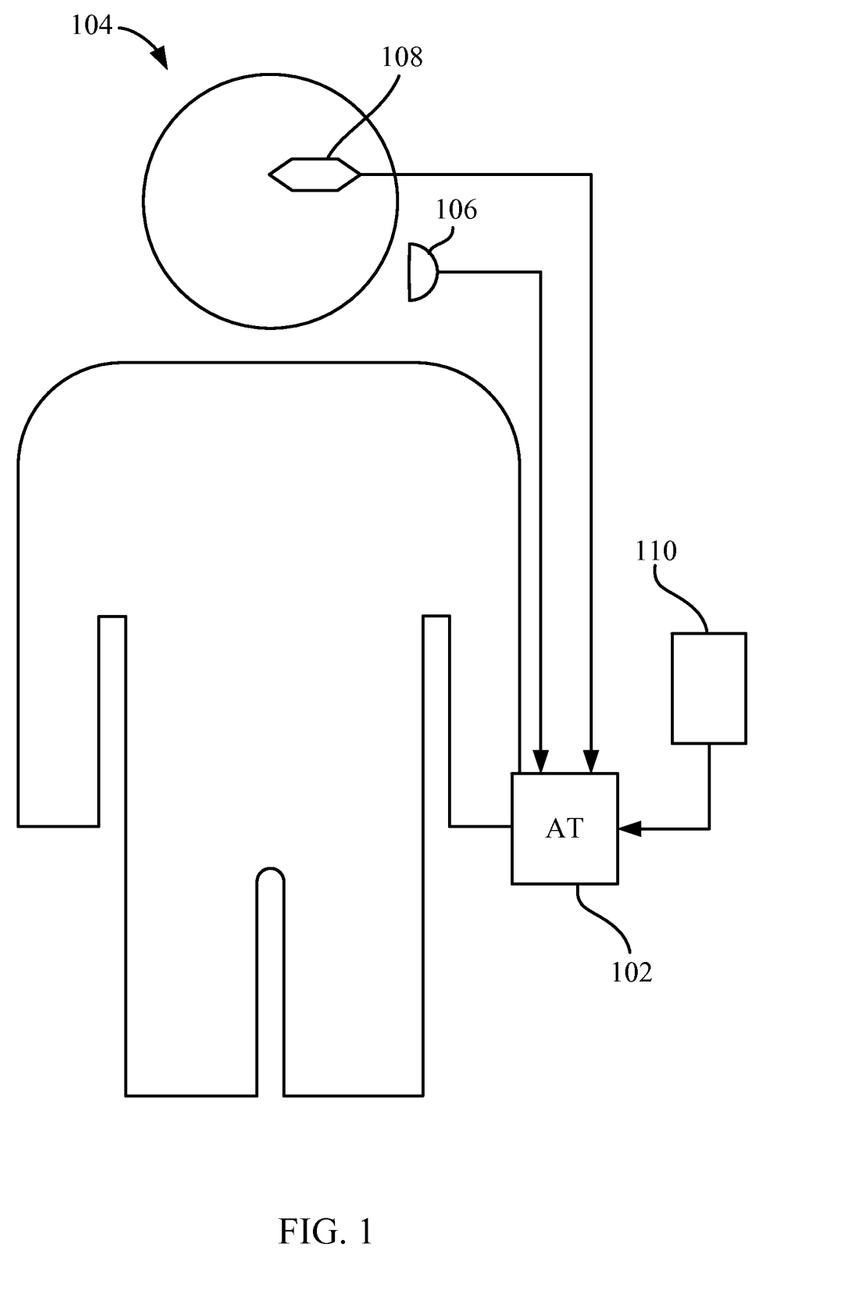
FIG. 1 is a conceptual block diagram showing an access terminal in association with a user to obtain one or more user cues.

Various aspects of the present disclosure are directed toward access terminals adapted to employ detected user cues to affect a wireless communication link within a wireless communication system. Referring to FIG. 1, a conceptual block diagram is illustrated, showing an access terminal 102 in association with a user 104. Many access terminals 102 are adapted to travel with the user, such as by being carried in a user's clothing, by being mounted in a carrier coupled to a user or to an object being used by a user (e.g., mounted to a carrier coupled to a bike being used by a user), by being worn by a user (e.g., a watch, glasses), etc. The access terminal 102 may be associated with a variety of input devices, which input devices may be integral to the access terminal 102 and/or external to the access terminal 102 while being communicatively coupled with the access terminal 102. By way of example and not limitation, such input devices may include a microphone 106, an eye gaze tracker 108, a gesture detector 110, and/or various other user input devices and sensor input device. The access terminal 102 can receive and process the various input information received by the various input devices, and can affect a wireless communication link in response to predefined states from the input devices. The access terminal 102 may also include a variety of output devices (not shown) including a display (e.g., a touchscreen display, a head-mounted display, a watch display), a speaker, a tactile output device, and/or various other output devices.

Figure 2:
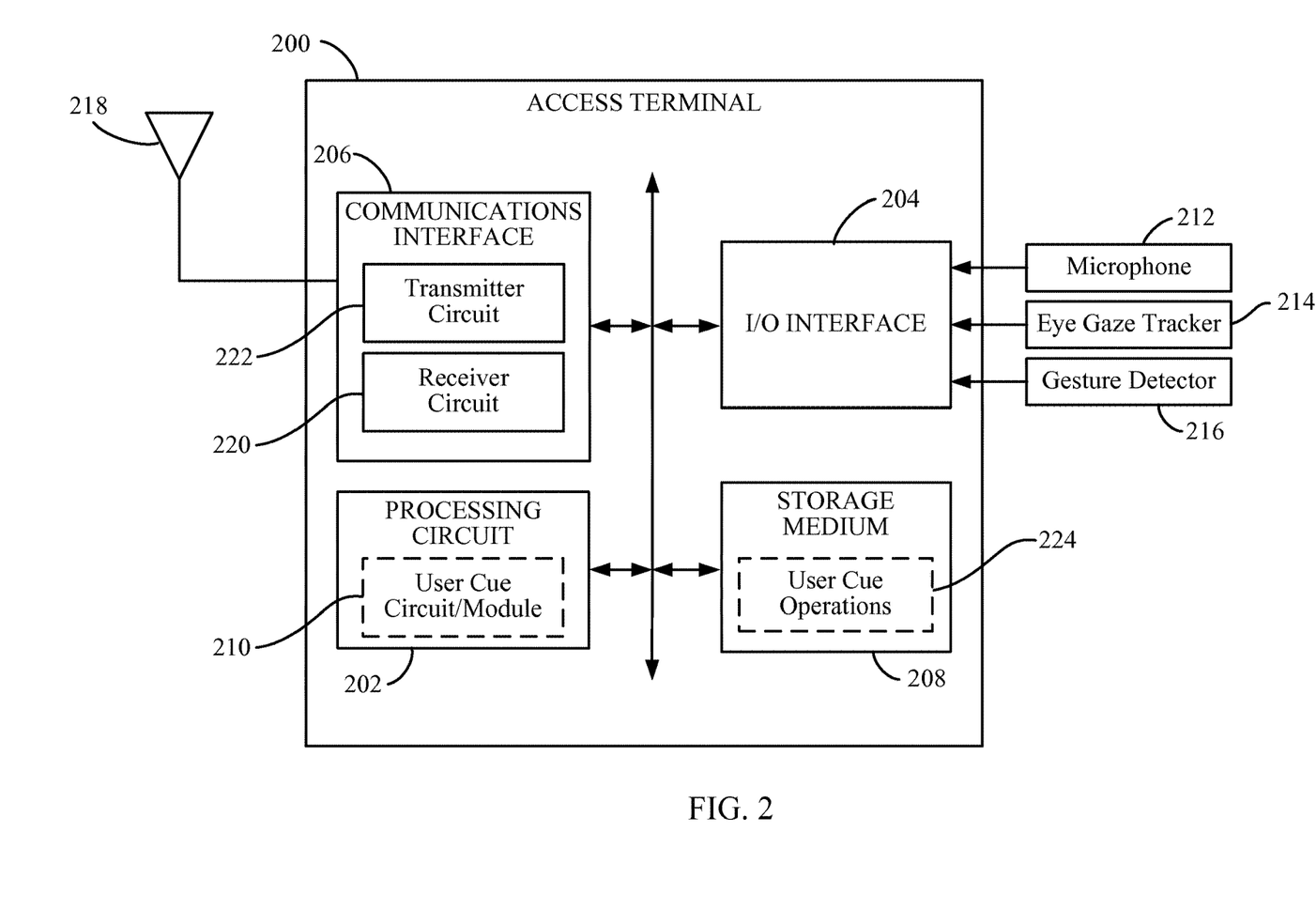
FIG. 2 is a block diagram illustrating select components of an access terminal according to at least one example.

Turning to FIG. 2, a block diagram is shown of an access terminal 200 according to at least one example of the present disclosure. The access terminal 200 includes a processing circuit 202 coupled to or placed in electrical communication with an I/O interface 204, a communications interface 206, and a storage medium 208.

The processing circuit 202 is arranged to obtain, process and/or send data, control data access and storage, issue commands, and control other desired operations. The processing circuit 202 may include circuitry adapted to implement desired programming provided by appropriate media, and/or circuitry adapted to perform one or more functions described in this disclosure. For example, the processing circuit 202 may be implemented as one or more processors, one or more controllers, and/or other structure configured to execute executable programming Examples of the processing circuit 202 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 202 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 202 are for illustration and other suitable configurations within the scope of the present disclosure are also contemplated.

The processing circuit 202 is adapted for processing, including the execution of programming, which may be stored on the storage medium 206. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 202 may include a user cue circuit and/or module 210. The user cue circuit/module 210 may include circuitry and/or programming (e.g., programming stored on the storage medium 208) adapted to obtain user cues, and affect a wireless communication link with another user's access terminal in response to a combination of obtained user cues.

The I/O interface 204 is adapted to enable the access terminal 200 to obtain inputs from various input devices, and to provide outputs to various output devices. In some examples, the I/O interface 204 may be adapted to obtain input information from a plurality of primary sensors including a microphone 212, an eye gaze tracker 214, and/or a gesture detector 216. The microphone 212 may be adapted for obtaining audio cues from a user of the access terminal 200, such as the user's words, the user's speech volume, and/or other sounds from the user. The microphone 212 may also be adapted for obtaining audio cues associated with the user's environment. Although reference may be made to only one microphone 212, it should be apparent that some embodiments may employ multiple microphones, which may also be employed for monitoring different cues.

The eye gaze tracker 214 may be adapted to obtain user cues associated with where and at what the user is looking by determining a user's eye positions and/or eye movement for detecting where a user is looking. In some instance, the eye gaze tracker 214 may be implemented by one or more cameras or other optical sensor(s) in combination with programming to track a user's eye gaze. For example, at least one user-directed camera may be adapted to determine the direction of the user's eye gaze, while at least one oppositely-directed scene camera detects an object at which the user's eye gaze is directed. Sensors may also be included to track the user's head position for determining gaze direction.

The gesture detector 216 may be adapted for obtaining and recognizing user cues associated with the user's gestures. The gesture detector 216 may include one or more depth-aware cameras, standard 2-dimensional cameras, and/or body mounted sensors, as well as any other known gesture detection components.

In addition to such primary input sensor devices, the I/O interface may further be adapted to obtain inputs from one or more other devices (e.g., secondary input sensor devices), such as a location detection device (e.g., GPS), a motion detection device (e.g., accelerometers, GPS), a biometric sensor device (heart rate sensor, muscle sensor), etc. The I/O interface may also be adapted to provide information to one or more output devices, such as a display (e.g., a touchscreen display, a head-mounted display, a watch display), a speaker, a tactile output device, and/or various other output devices.

The communications interface 206 is configured to facilitate wireless communications of the access terminal 200. For example, the communications interface 206 may include circuitry and/or programming adapted to facilitate the communication of information bi-directionally with respect to one or more wireless network devices (e.g., network nodes) and/or one or more other access terminals. The communications interface 204 may be coupled to one or more antennas 218, and includes wireless transceiver circuitry, including at least one receiver circuit 220 (e.g., one or more receiver chains) and/or at least one transmitter circuit 222 (e.g., one or more transmitter chains).

The communications interface 206 may be adapted to facilitate connection to one or more wireless communication networks such as, for example, a wireless wide-area network (WWAN), a wireless local-area network (WLAN), a wireless personal area network (PAN), and/or other suitable wireless communication network.

Figure 3:
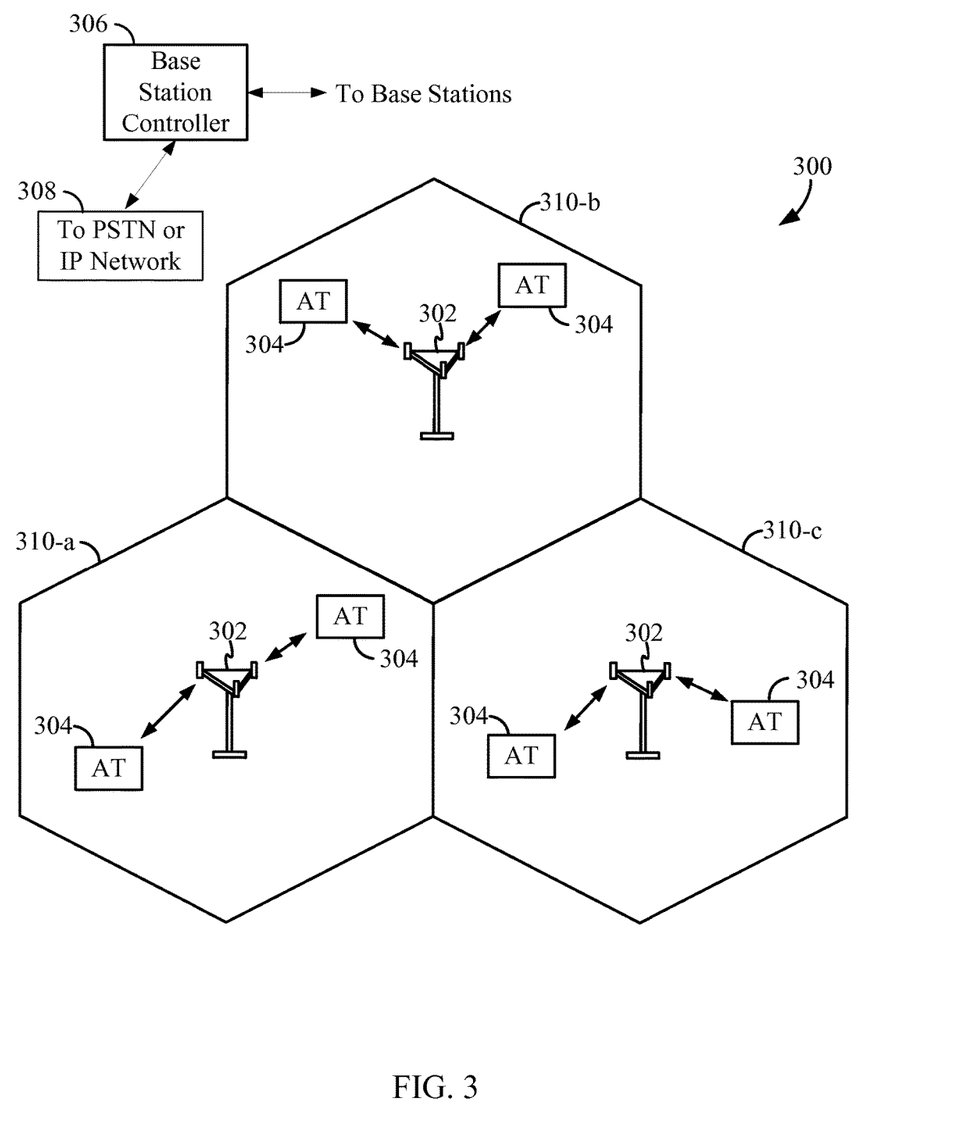
FIG. 3 is a block diagram depicting an example of a wireless network environment to which an access terminal may be connected.

FIG. 3 is a block diagram depicting an example of a wireless network environment to which the communications interface 206 may be connected. The wireless communication network 300 generally includes one or more base stations 302, one or more access terminals 304, one or more base station controllers (BSC) 306, and a core network 308 providing access to a public switched telephone network (PSTN) (e.g., via a mobile switching center/visitor location register (MSC/VLR)) and/or to an IP network (e.g., via a packet data switching node (PDSN)). The wireless communication network 300 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SCFDMA) signal, etc. Each modulated signal may be sent on a different carrier and may carry control information (e.g., pilot signals), overhead information, data, etc.

The base stations 302 can wirelessly communicate with the access terminals 304 via a base station antenna. The base stations 302 may each be implemented generally as a device adapted to facilitate wireless connectivity (for one or more access terminals 304) to the wireless communication network 300. Such a base station 302 may also be referred to by those skilled in the art as a base transceiver station (BTS), a radio base station, a radio transceiver, a transceiver function, a basic service set (BSS), and extended service set (ESS), a node B, a femto cell, a pico cell, an access point, or some other suitable terminology.

The base stations 302 are configured to communicate with the access terminals 304 under the control of the base station controller 306. Each of the base stations 302 can provide communication coverage for a respective geographic area. The coverage area 310 for each base station 302 here is identified as cells 310-*a*, 310-*b*, or 310-*c*. The coverage area 310 for a base station 302 may be divided into sectors (not shown, but making up only a portion of the coverage area). In various examples, the network 300 may include base stations 302 of different types.

One or more access terminals 304 may be dispersed throughout the coverage areas 310. Each access terminal 304 may communicate with one or more base stations 302. An access terminal 304 may generally include one or more devices that communicate with one or more other devices through wireless signals. Such an access terminal 304 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology.

Referring again to FIG. 2, the storage medium 208 may represent one or more processor-readable devices for storing programming, such as processor executable code or instructions (e.g., software, firmware), electronic data, databases, or other digital information. The storage medium 208 may also be used for storing data that is manipulated by the processing circuit 202 when executing programming. The storage medium 208 may be any available media that can be accessed by a general purpose or special purpose processor, including portable or fixed storage devices, optical storage devices, and various other mediums capable of storing, containing and/or carrying programming. By way of example and not limitation, the storage medium 208 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 208 may be coupled to the processing circuit 202 such that the processing circuit 202 can read information from, and write information to, the storage medium 208. That is, the storage medium 208 can be coupled to the processing circuit 202 so that the storage medium 208 is at least accessible by the processing circuit 202, including examples where the storage medium 208 is integral to the processing circuit 202 and/or examples where the storage medium 208 is separate from the processing circuit 202 (e.g., resident in the access terminal 200, external to the access terminal 200, distributed across multiple entities).

Programming stored by the storage medium 208, when executed by the processing circuit 202, causes the processing circuit 202 to perform one or more of the various functions and/or process steps described herein. In at least some examples, the storage medium 208 may include user cue operations 224 adapted to cause the processing circuit 202 to detect one or more user cues from a plurality of input devices via the I/O interface 204, and affect a wireless communication link with another user via the communications interface 206 in response to the detected user cues. Thus, according to one or more aspects of the present disclosure, the processing circuit 202 is adapted to perform (in conjunction with the storage medium 208) any or all of the processes, functions, steps and/or routines for any or all of the access terminals described herein (e.g., access terminal 104, access terminal 200). As used herein, the term "adapted" in relation to the processing circuit 202 may refer to the processing circuit 202 being one or more of configured, employed, implemented, and/or programmed (e.g., in conjunction with the storage medium 208) to perform a particular process, function, step and/or routine according to various features described herein.

Figure 4:
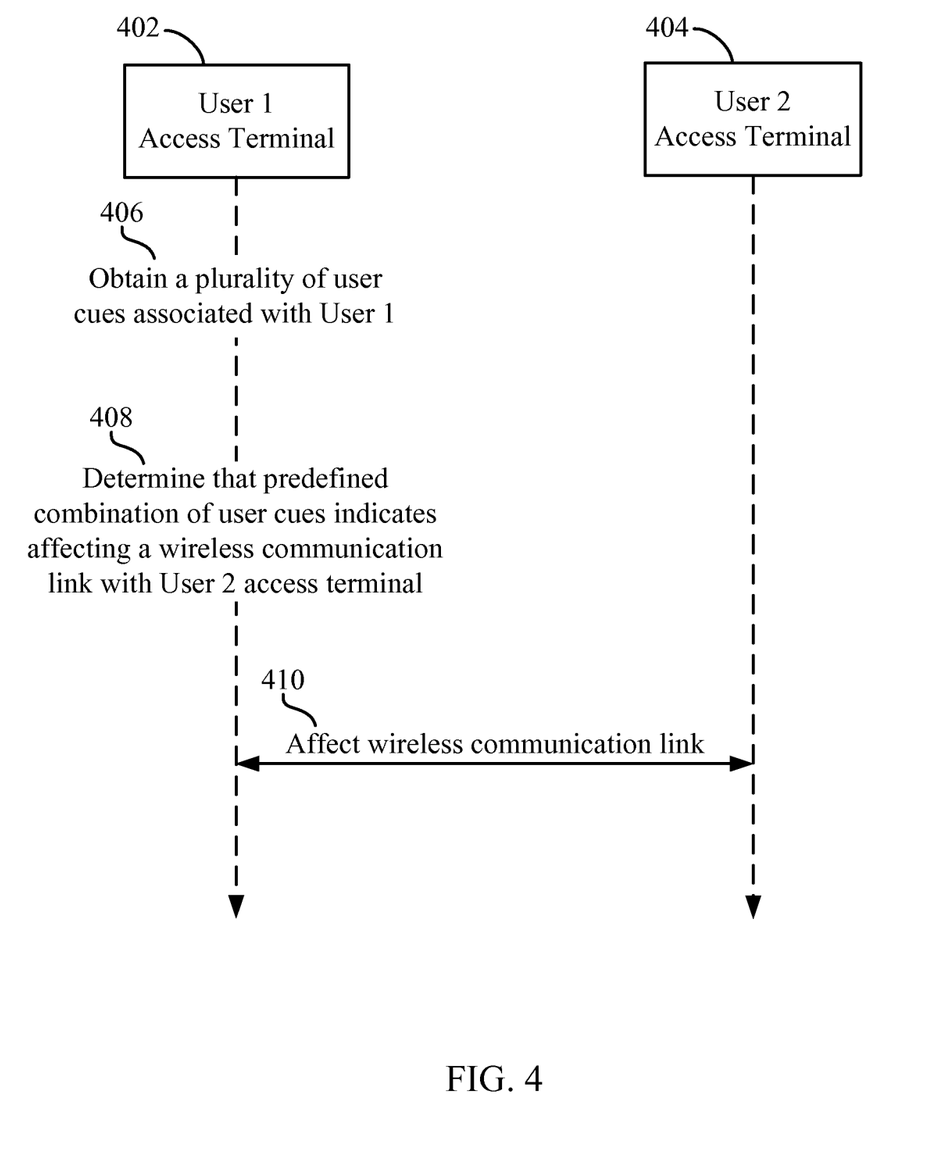
FIG. 4 is a flow diagram illustrating an example for affecting a wireless communication link between a first user and a second user.

In operation, the access terminal 200 can detect a plurality of user cues, including at least two user cues selected from an eye gaze, an audio cue, and a gesture. The access terminal 200 can then employ the detected user cues in affecting a wireless communication link with another user. For example, FIG. 4 is a flow diagram illustrating interaction between a first user's access terminal 402 and a second user's access terminal 404. The first user's access terminal 402 initially obtains 406 a plurality of user cues associated with the first user. At least two of the user cues may be obtained from an eye gaze, an audio cue, and/or a gesture. Such user cues may also be referred to herein as primary user cues. Additional user cues, which may be referred to as secondary user cues, may also be obtained, such as user location, user motion, biometric inputs, etc.

From the various user cues obtained, the first user's access terminal 402 can determine 408 that some predefined combination of user cues exist which indicate to the access terminal 402 to affect a wireless communication link with the second user's access terminal 404. In response to such a determination, the first user's access terminal 402 can affect 410 a wireless communication link with the second user's access terminal 404. For example, the first user's access terminal 402 may initiate or establish a wireless communication link with the second user's access terminal 404, may transmit and/or obtain information or data to/from the second user's access terminal 404 over a wireless communication link, and/or more terminate a wireless communication link with the second user's access terminal 404.

These features can be utilized in a variety of different scenarios. For instance, referring to the diagram in FIG. 2, a user of an access terminal 200 may go on a ski trip with one or more friends in one example. While skiing, the user may look at a friend skiing slightly ahead, and may begin to speak to the friend saying, for example, "Hey John, at the fork take the trail on the right, to chair 5." Conventionally, the user would have to yell loudly, use large gestures, or just fail to adequately communicate, which could result in missing the trail. According to aspects of the present disclosure, the access terminal 200 can employ cues obtained from, for example, an eye gaze tracker 214 that detects the user's gaze at the friend, and a microphone 212 that detects the user's speech directed to the friend. In response to these detected user cues, the access terminal 200 can open a communication link to the friend's access terminal to enable the communication to more effectively reach the friend. For example, the access terminal 200 may send an indication (e.g., visual, audio, haptic) to the friend to go on the indicated trail, and information to go to chair 5 can be communicated to the friend without the stopping or shouting.

In another example, a user of an access terminal 200 may go on a bicycle ride along the boardwalk with a friend. While riding, the user may look at the friend and speak to the friend saying something like "have you heard that new song?". Conventionally, the user could share the song with the friend using speakers that both can hear, sharing headphones, or passing an individual media player device between them to take turns. According to aspects of the present disclosure, user cues can be obtained from, for example, an eye gaze tracker 214 that detects the user's gaze at the friend, and a microphone 212 that detects the user's speech directed to the friend. In response to these detected user cues, the access terminal 200 can open a communication link to the friend's access terminal to enable the user and the friend to share music from a common music player. Additionally, if speech is detected by the microphone 212 while the music is being shared, the volume can adapt to allow easy communication.

In yet another example, a user of an access terminal 200 may be speaking with another person using the access terminal 200. During a conversation, the user may observe an event, item, person or other thing that the user wishes the other person could see. The user may state something like "you should see this." Conventionally, the user would explain what was being observed, or may take a photograph or video to send to the other person. According to aspects of the present disclosure, user cues can be obtained from, for example, an eye gaze tracker 214 detecting the user's gaze at a particular object or event, a microphone 212 detecting the user's speech to the other person, and/or a gesture detector 216 detecting a user's gestures (e.g., the user pointing toward the object or event). In response to these detected user cues, the access terminal 200 can modify the communication link with the other person from a voice-only communication link to a video and voice communication link to show the other person what the user is seeing.

In still another example, a user of an access terminal 200 may see a friend across a distance. The user may call out to the friend saying, for instance, "hello, John," and may also wave to the friend. Conventionally, the user would shout to the friend if further conversation were desired. According to aspects of the present disclosure, user cues can be obtained from, for example, an eye gaze tracker 214 detecting the user's gaze at the friend, a microphone 212 detecting the user's salutation to the friend and/or further speech to the friend, and/or a gesture detector 216 detecting the user's wave to the friend. In response to these detected user cues, the access terminal 200 can initiate a communication link with an access terminal belonging to the friend to continue the conversation.

In yet another example, an access terminal 200 may share information obtained from the input devices to another person in a meaningful way. For example, a user of an access terminal 200 may be at an event with a friend who is unfamiliar with various aspects of the event. For instance, the user of the access terminal 200 may be at a sporting event with a friend who is unfamiliar with the sport. Conventionally, the friend would just take cues from others to learn where to look and how to react, and/or the user would have to spend time explaining to the novice the various aspects of the event. According to aspects of the present disclosure, user cues can be obtained from, for example, an eye gaze tracker 214 detecting the user's gaze at different areas of the field of play during the game (e.g., at different players, different areas of a court or field), a microphone 212 detecting the user's expressions (e.g., cheering, anger, anticipation, frustration), and/or a gesture detector 216 detecting the user's gestures (e.g. pointing to areas of the field of play, gestures indicating cheering, anger, anticipation, frustration, etc.). In response to these detected user cues, the access terminal 200 can convey information to the friend, who may be using a head-mounted display, to indicate various information. For example, the conveyed information may be adapted to display a heat map or trace on the friend's display to indicate where the friend should be looking, and/or an indication whether something positive or negative is occurring, etc.

In addition to the primary user cues referred to above (e.g., eye gaze, audio cue, and gesture), the access terminal 200 may also employ one or more additional or secondary user cues to more accurately determine that the user desires the communications link to be affected in a particular manner. For example, in the skiing example described above, the access terminal 200 may also employ cues obtained from other input devices, such as a location tracker, a motion tracker, and/or a biometric input device to enable greater accuracy in performing action that coincide with the user's intent. For instance, such input devices may indicate that the user is sharing the skiing experience with the friend based on cues such as the two people arriving at the mountain together, the friend being in the user's list of contacts, similar motion and activity (e.g., getting in a car, walking, getting on a chair lift, skiing, etc.). In the biking example described above, the access terminal 200 may also employ cues obtained from other inputs devices, which may indicate that the user is experiencing the biking experience with the friend based on information such as the two arriving at the same time, exerting similar physiological efforts, and moving about the same pace.

The forgoing examples are only for purposes of illustration and should not limit the scope of the present disclosure. Those of ordinary skill in the art will recognize that a variety of other scenarios may employ the features of the present disclosure and/or details of any particular scenario may vary in many different ways.

Figure 5:
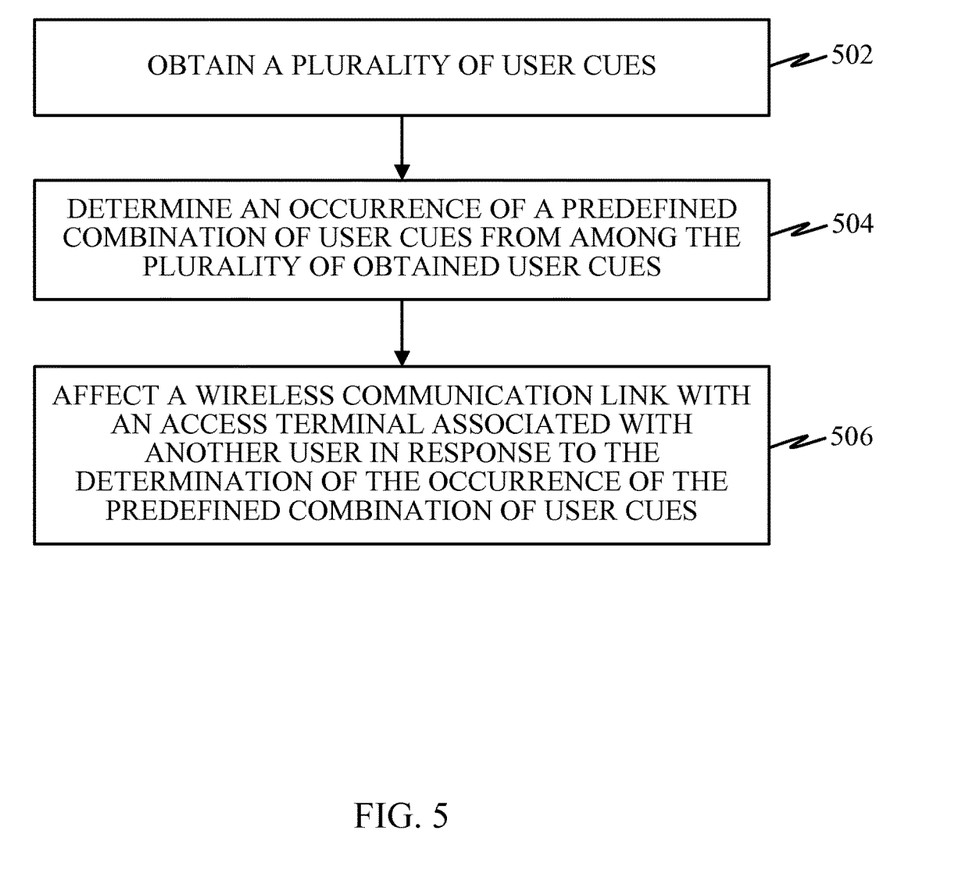
FIG. 5 is a flow diagram illustrating a method operational on an access terminal according to at least one example.

FIG. 5 is a flow diagram illustrating at least one example of a method operational on an access terminal, such as the access terminal 200. Referring to FIGS. 2 and 5, an access terminal 200 can obtain a plurality of user cues at 502. For example, the processing circuit 202 (e.g., the user cue circuit/module 210) executing the user cue operations 224 can detect user cues via a plurality of sensors (e.g., input devices coupled to the I/O interface 204). As noted previously, the input devices may include primary sensor inputs (e.g., microphone 212, eye gaze tracker 214, gesture detector 216), as well as secondary sensor inputs (e.g., location detector, motion detector, biometric sensor).

In some implementations, the plurality of user cues can include at least two primary sensor inputs from among an eye gaze, an audio cue, and/or a gesture. User cues may also be obtained from one or more secondary sensor inputs, such as a geographic location, motion, and/or a biometric cue, as well as other secondary sensor inputs.

At 504, the access terminal 200 can determine an occurrence of a predefined combination of user cues from among the plurality of obtained user cues. For example, the processing circuit 202 (e.g., the user cue circuit/module 210) executing the user cue operations 224 can compare the detected user cues to predefined combinations that are known to indicate a specific desire by the user to communicate with another person. For example, various predefined combinations of user cues can indicate a desire by the user to communicate with another user. The various examples described above include examples of combinations of user cues that typically indicate a desire by the user to communication with another person, such as looking at the other person and speaking to them, speaking to the other person and using a gesture toward the other person or something the user wants the other person to see, looking at the other person and using a gesture, looking at an event or object and speaking about the observance to the other person, etc.

At 506, the access terminal 200 can affect a wireless communication link with an access terminal associated with another user in response to the determination of the occurrence of the predefined combination of user cues. For example, the processing circuit 202 (e.g., the user cue circuit/module 210) executing the user cue operations 224 can affect a wireless communication link via the wireless communications interface 206 with an access terminal associated with the other user in response to the detected user cues.

The wireless communication link may be affected in any of a variety of ways. For example, a wireless communication link with the access terminal associated with the other user may be established in response to the particular user cues. In another example, the access terminal 200 may employ an existing wireless communication link with the access terminal associated with the other user to send one or more transmissions to the other user (e.g., via the wireless communications interface 206) in response to the particular user cues. In some instances, this may include transmitting information obtained from the user cues. In yet another example, a wireless communication link with the access terminal associated with the other user may be terminated in response to the particular user cues.

While the above discussed aspects, arrangements, and embodiments are discussed with specific details and particularity, one or more of the components, steps, features and/or functions illustrated in FIGS. 1, 2, 3, 4, and/or 5 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, and/or 3 may be configured to perform or employ one or more of the methods, features, parameters, and/or steps described in FIGS. 4 and/or 5. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An access terminal, comprising:
    a wireless communications interface;
    a plurality of sensors; and
    a processing circuit coupled to the communications interface and the plurality of sensors, the processing circuit adapted to:
    detect user cues via the plurality of sensors, wherein the user cues correspond to at least two of an eye gaze, an audio cue, or a hand gesture;
    determine that a predefined combination of at least two of the user cues detected via the plurality of sensors has occurred, the predefined combination of at least two of the user cues comprising at least an eye gaze user cue and a hand gesture user cue, each being directed towards a physical location of another user and indicating a desire by a user of the access terminal to terminate communication with the other user; and
    automatically terminate, without further user input, a wireless communication link via the wireless communications interface with an access terminal associated with the other user in response to the predefined combination of at least two of the user cues;
    determine that an additional predefined combination of at least two of the user cues has occurred; and
    automatically send one or more transmissions over the wireless communication link to the access terminal associated with the other user in response to the additional predefined combination of at least two of the user cues prior to termination of the wireless communication link;
    wherein the automatically sending of one or more transmissions over the wireless communication link to the access terminal associated with the other user comprises:
    automatically transmit one or more messages comprising information obtained from the additional predefined combination of at least two of the user cues to the access terminal associated with the other user for display on the second access terminal as an overlay within a field-of-view of the second access terminal.

2. The access terminal of claim 1, wherein the processing circuit is further adapted to:
    determine that a second additional predefined combination of at least two of the user cues has occurred; and
    automatically establish the wireless communication link with the access terminal associated with the other user in response to the second additional predefined combination of at least two of the user cues.

3. The access terminal of claim 2, wherein the wireless communication link comprises a voice-only wireless communication link and the processing circuit is further adapted to:
    determine that a third additional predefined combination of at least two of the user cues has occurred; and
    automatically modify the wireless communication link from the voice-only wireless communication link to a video and voice wireless communication link to transmit both video data and speech over the video and voice wireless communication link in response to the third additional predefined combination of at least two of the user cues.

4. The access terminal of claim 1, wherein the plurality of sensors comprise two or more sensors selected from the group of sensors including a microphone, an eye gaze tracker, and a gesture detector.

5. The access terminal of claim 4, wherein the plurality of sensors further comprise at least one sensor selected from the group of sensors including a location detector, a motion detector, and a biometric sensor.

6. The access terminal of claim 1, wherein the processing circuit is further adapted to: detect user cues corresponding to at least one of a geographic location, motion, and a biometric cue.

7. The access terminal of claim 1, wherein the plurality of sensors further comprise at least one sensor selected from a group of sensors including a location detector and a motion detector.

8. The access terminal of claim 1, wherein the wireless communication link comprises a direct wireless communication link between the access terminal and the access terminal associated with the other user.

9. A method of wireless communication between a first user and a second user, comprising:
    obtaining a plurality of user cues at a first access terminal associated with the first user, including user cues from at least two primary sensor inputs, the plurality of user cues comprising at least two of an eye gaze, an audio cue, or a hand gesture;
    determining, by the first access terminal, an occurrence of a predefined combination of at least two user cues from among the plurality of obtained user cues, the predefined combination of the at least two user cues comprising at least an eye gaze user cue and a hand gesture user cue, each being directed towards a physical location of the second user and indicating a desire by the first user to terminate communication with the second user; and
    automatically terminating, by the first access terminal, without further user input, a wireless communication link with a second access terminal associated with the second user in response to the determination of the occurrence of the predefined combination of the at least two user cues;
    determining, by the first access terminal, an occurrence of an additional predefined combination of at least two user cues from among the plurality of obtained user cues; and
    in response to the additional predefined combination of the at least two user cues, automatically sending transmissions over the wireless communication link to the second access terminal associated with the second user prior to termination of the wireless communication link;

wherein automatically sending transmissions over the wireless communication link to the second access terminal associated with the second user comprises:
automatically transmitting one or more messages comprising information obtained from the additional predefined combination of the at least two user cues to the second access terminal associated with the second user for display on the second access terminal as an overlay within a field-of-view of the second access terminal.

10. The method of claim 9, wherein obtaining the plurality of user cues, including user cues from at least two primary sensor inputs comprises:
obtaining user cues from at least two primary sensor inputs selected from a group of primary sensor inputs comprising an eye gaze, an audio cue, and a gesture.

11. The method of claim 9, wherein obtaining a plurality of user cues further comprises:
obtaining a user cue from at least one secondary sensor input.

12. The method of claim 11, wherein obtaining a user cue from at least one secondary sensor input comprises:
obtaining a user cue from at least one of secondary sensor input selected from a group of secondary sensor inputs comprising a location, motion, and a biometric cue.

13. An access terminal, comprising:
means for detecting a plurality of user cues, including user cues from at least two primary sensor inputs selected from a group of primary sensor inputs comprising an eye gaze, an audio cue, and a hand gesture;
means for determining that a predefined combination of at least two of the user cues has occurred, the predefined combination of at least two of the user cues comprising at least an eye gaze user cue and a gesture user cue, each being directed towards a physical location of another user and indicating a desire by a user of the access terminal to terminate communication with the other user; and
means for automatically terminating, without further user input, a wireless communication link with an access terminal associated with the other user in response to the predefined combination of at least two of the user cues;
means for determining an occurrence of an additional predefined combination of at least two of the user cues; and
in response to the additional predefined combination of the at least two user cues:
means for automatically sending transmissions over the wireless communication link to the access terminal associated with the other user prior to termination of the wireless communication link;
wherein the means for sending transmissions over the wireless communication link to the access terminal associated with the other user comprises:
means for transmitting one or more messages comprising information obtained from the additional predefined combination of at least two of the user cues to the access terminal associated with the other user for display on the second access terminal as an overlay within a field-of-view of the second access terminal.

14. The access terminal of claim 13, further comprising:
means for detecting at least one user cue from at least one secondary sensor input.

15. The access terminal of claim 14, wherein the means for detecting at least one user cue from at least one secondary sensor input comprises:
means for detecting a user cue from at least one of secondary sensor input selected from a group of secondary sensor inputs comprising a location, a motion, and a biometric cue.

16. A non-transitory processor-readable storage medium, comprising programming for causing a processing circuit to:
obtain a plurality of user cues at a first access terminal associated with a first user, wherein the plurality of user cues comprise user cues from at least two primary sensor inputs selected from a group of primary sensor inputs comprising an eye gaze, an audio cue, and a hand gesture;
determine an occurrence of a predefined combination of at least two user cues from among the plurality of obtained user cues at the first access terminal, the predefined combination of the at least two user cues comprising at least an eye gaze user cue and a gesture user cue, each being directed towards a physical location of a second user and indicating a desire by the first user to terminate communication with the second user; and
automatically terminate, without further user input, a wireless communication link between the first access terminal and a second access terminal associated with the second user in response to the determination of the occurrence of the predefined combination of the at least two user cues;
determine an occurrence of an additional predefined combination of at least two user cues from among the plurality of obtained user cues; and
in response to the additional predefined combination of the at least two user cues, automatically send transmissions over the wireless communication link to the second access terminal associated with the second user prior to termination of the wireless communication link;
wherein the programming for causing a processing circuit to automatically send transmissions over the wireless communication link to the second access terminal associated with the second user comprises programming for causing a processing circuit to:
automatically transmit one or more messages comprising information obtained from the additional predefined combination of the at least two user cues to the second access terminal associated with the second user for display on the second access terminal as an overlay within a field-of-view of the second access terminal.

17. The processor-readable storage medium of claim 16, further comprising programming for causing a processing circuit to:
determine a second occurrence of an additional predefined combination of at least two user cues from among the plurality of obtained user cues; and
in response to the second additional predefined combination of the at least two user cues, automatically establish the wireless communication link with the second access terminal associated with the second user.

18. The processor-readable storage medium of claim 16, wherein the programming for causing a processing circuit to obtain a plurality of user cues comprises programming for causing a processing circuit to:
obtain a user cue from at least one secondary sensor input.

19. The processor-readable storage medium of claim 18, wherein the programming for causing a processing circuit to obtain a user cue from at least one secondary sensor input comprises programming for causing a processing circuit to:

obtain a user cue from at least one of secondary sensor input selected from a group of secondary sensor inputs comprising a location, motion, and a biometric cue.

\* \* \* \* \*